H. S. JEWELL.
Middlings-Purifiers.

No. 149,662. Patented April 14, 1874.

Witnesses
Chas. H. Smith
Geo. T. Pinckney

Inventor
Herbert S. Jewell
per Lemuel W. Serrell
Atty.

AM. PHOTO-LITHOGRAPHIC CO. N.Y. (OSBORNE'S PROCESS.)

H. S. JEWELL.
Middlings-Purifiers.

No. 149,662. Patented April 14, 1874.

Witnesses,
Chas. H. Smith
Geo. T. Pinckney

Inventor
Herbert S. Jewell
per Lemuel W. Serrell
Atty

UNITED STATES PATENT OFFICE.

HERBERT S. JEWELL, OF BROOKLYN, NEW YORK.

IMPROVEMENT IN MIDDLINGS-PURIFIERS.

Specification forming part of Letters Patent No. 149,662, dated April 14, 1874; application filed January 22, 1874.

*To all whom it may concern:*

Be it known that I, HERBERT S. JEWELL, of Brooklyn, in the county of Kings and State of New York, have invented an Improvement in Middlings-Purifiers, of which the following is a specification:

The bolting-cloth, upon which the middlings are supplied, has been agitated, but at the supply end; the material is in such a compact layer that the air has but little opportunity to pass up through the same, and hence the separation is not as perfect or rapid as it is toward the opposite portion of the bolt. In order to clear the under side of the bolt a circular brush has been rolled along in contact with the under side of the cloth, and a revolving beater has also been used for the same purpose. My invention is made with reference to loosening up the middlings, and preserving the mass in such a constant state of agitation that the air will act in the most reliable manner in conveying away the fine particles of bran. This object is effected by a centrifugal beater or brush and fan combined, made of bars armed with brushes, and so arranged and operated that the bolting-cloth is exposed throughout to a uniform operation with great rapidity, the result of the use of this fan brush or beater being that the middlings are lifted by the blast of air that is thrown off by the centrifugal action, and lightened up. At the same time the brush-fan removes any particles of flour upon the under side of the bolt, or draws the same down out of the bolt-cloth by the minus atmospheric action behind each brush-blower; or such particles are forced upwardly by the atmosphere driven off from the next fan-brush, and the flour is free to fall unobstructedly; the result of these operations being that the bolt-cloth is kept free from accumulations, and the middlings are in a light and open condition, and the particles of bran and foreign matter are carried off with greater rapidity and reliability than heretofore.

Figure 1:
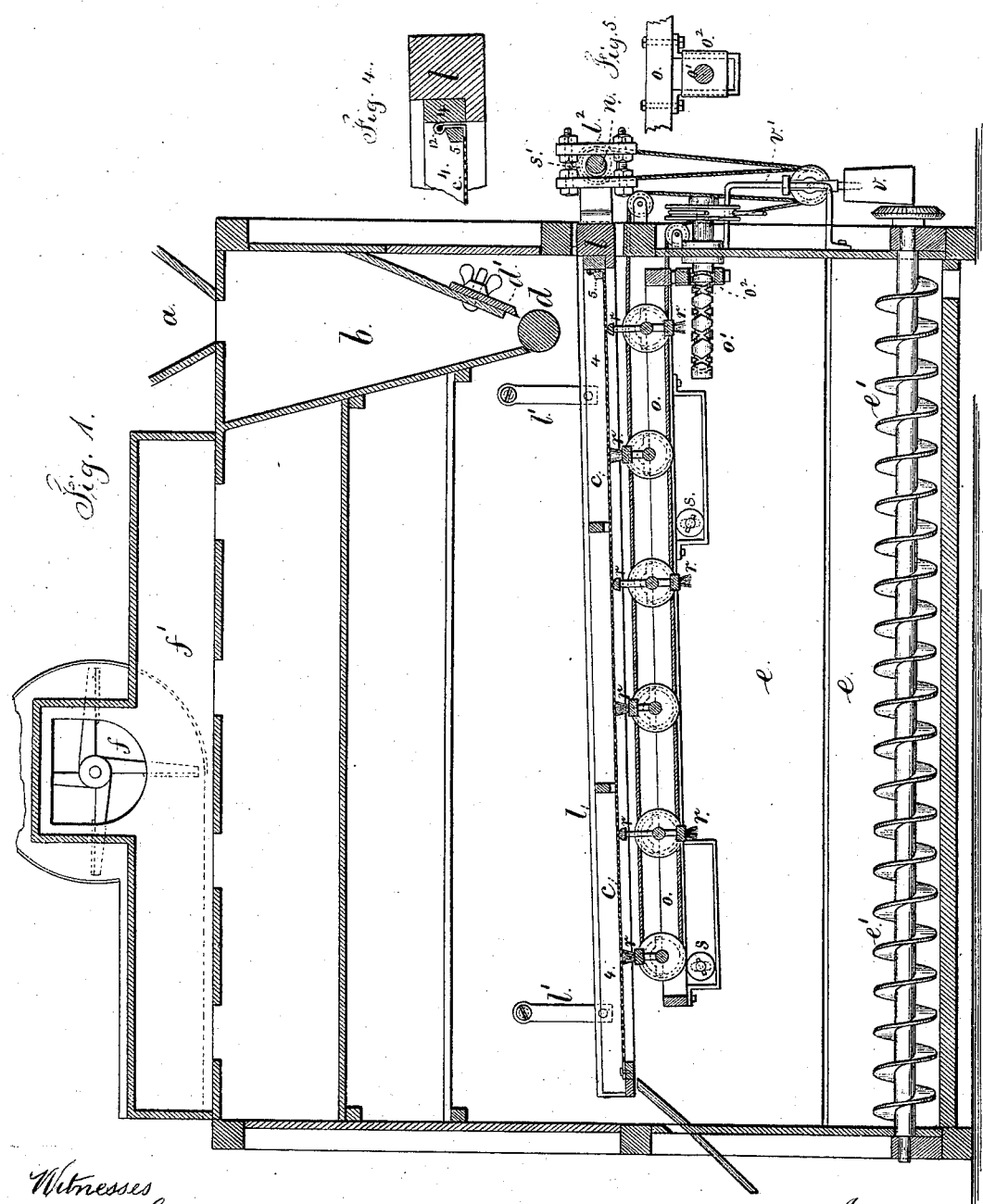
Figure 2:
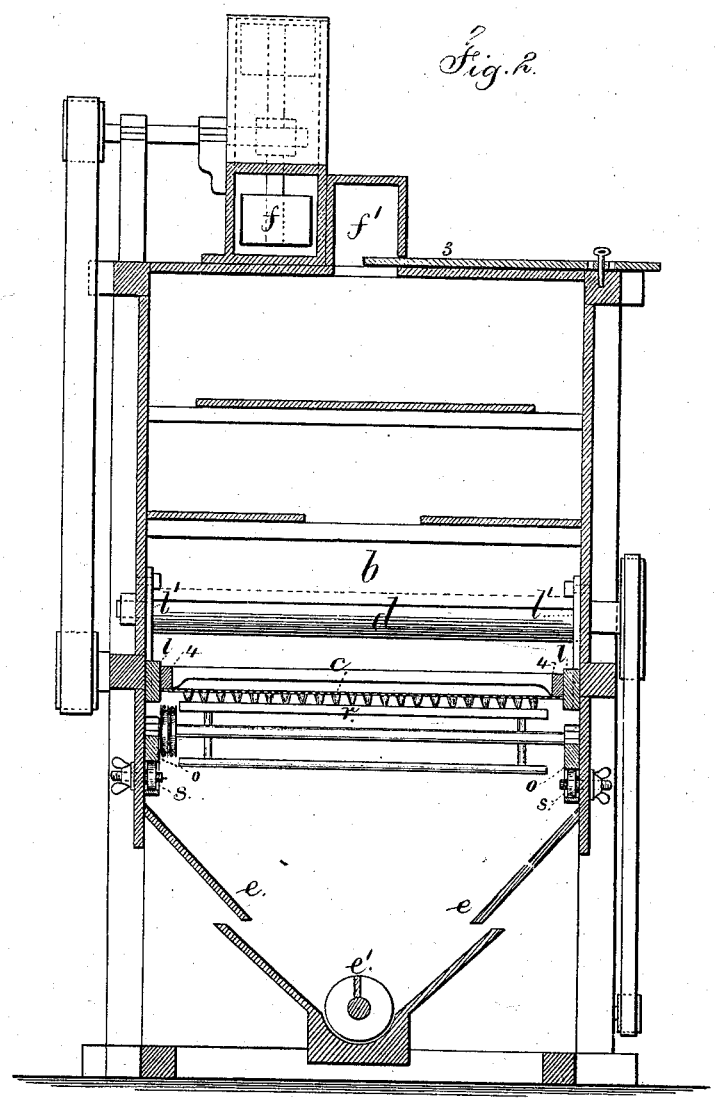
Figure 3:
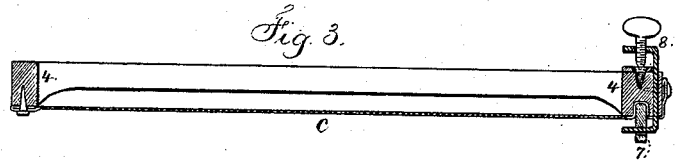

In the drawings, Figure 1 is a vertical longitudinal section of the purifying apparatus. Fig. 2 is a cross-section of the same, and Fig. 3 is a section in larger size of the apparatus for tightening the bolting-cloth.

The middlings are supplied by the spout $a$, and pass to the hopper $b$, from which they are fed, in a regular and uniform manner, upon the upper end of the bolt $c$ by the roller $d$, that is revolved by a suitable belt. The adjustable feed-board $d'$ determines the width of mouth through which the flour passes, and hence the quantity delivered.

The flour falls from the bolt, and is directed, by the inclines $e$, to the trough and conveyer $e'$, of usual character. The particles of bran and foreign matter are drawn upwardly by the current of air produced by the fan $f$. The air enters below the inclines $e$ $e$, and the exhaustion-blower is connected, at its center, with the trunk $f$, that runs along over the top of the inclosure or case containing the apparatus; and dampers 3 3 are provided at suitable distances, to regulate the action of the ascending currents of air, and cause the same to be more or less rapid at different portions of the case.

The bolt-cloth $c$ is applied to the under edges of the frame 4, and such cloth is attached, by tacks, at the edges and at one end, and the other end is secured by the clamping-strip 5, (see Fig. 4,) screwed to the frame, there being a wire or cord, 12, sewed into a fold of the bolting-cloth above the strip 5. This prevents the cloth being injured at this end by any accumulation of middlings upon the same, and, at the same time, allows the bolt-cloth to be stretched transversely, as next described. This bar and wire or cord may be used, also, at the tail of the bolt, and below the same, so as not to interfere with the escape of the bran from the lower end of the bolt.

The tightening-bar 7 is applied below the groove in the under side of the frame, and this bar 7 is drawn up against the bolt-cloth, to press it into the groove and tighten it, by means of hooked gibs and set-screws 8. By this means the cloth can be tightly strained, especially at the upper end. The frame of the bolting-cloth is set in the vibratory frame $l$, that is hung by links $l^1$ inside the case, and at the end of the machine there is a cam or eccentric, $l^2$, upon the shaft $n$, that vibrates the bolt at the proper speed. There is a frame, $o$, below the bolt, to which an endwise movement is given by an endless screw, $o^1$, that acts upon a nut, $o^2$, fitted to move vertically in guides upon the frame $o$. (See Fig. 5.) Said screw is revolved by suitable mechanism, and within this frame there are the centrifugal brush-blowers $r\ r$; and the distances that the shafts of these are placed apart in the frame is less than the amount of end motion given by the screw, so that all parts of the under side of the bolt are equally exposed to the action of the centrifugal brush-blowers, as they operate progressively along upon the under side of the bolt, and then move back in the other direction. Each brush-blower is made as an open frame of bars, with brushes or wipers upon their edges, and they operate, as before detailed, to force air into the middlings and lighten the same, to brush or wipe the under surface of the cloth, and to produce a minus atmospheric action to draw particles of flour down out of the cloth.

I have represented the frame $o$ as supported upon adjustable bearings $s$, that allow for positioning the frame so that the brushes just touch the bolt, and the brush-blowers are revolved by belts around pulleys at their ends, receiving motion from the pulley $s'$, and the tightening-weight $v$ in guides $v'$ rises and falls as the frame is reciprocated, and maintains the necessary tension on the belt.

In consequence of having a series of revolving brush-blowers, the action will be much more uniform and rapid than with the devices heretofore employed, because each brush-blower only acts upon a limited surface of the bolt as the parts are reciprocated, and the cloth does not become loaded, and it is not unnecessarily worn, and the speed of each brush-blower can be proportioned to the resistance by the middlings upon the bolt, so that the entire mass will be proportionately lightened by the action of the air.

I am aware that brushes and fans have been employed below the bolt, and that they have been revolved, and also moved along so as to act upon the under surface of the bolt from end to end.

I do not claim a revolving beater or brush moved along laterally beneath the bolt, or reciprocated, as these have been used; but the beaters or brushes, being upon the surface of a cylinder, interfere with the upward current of air, and do not act to raise the bolt-cloth slightly and shake the same for separating the flour. In my purifier, the brushes being upon the edges of bars, there is a greater fanning centrifugal action, and the free passage of air to the bolt is not interfered with.

I do not claim a double-threaded screw for reciprocating a cleaning device, the same being shown in Letters Patent No. 139,397.

I claim as my invention—

1. A series of brush-blowers revolved beneath the bolt, in combination with the frame receiving such series of brush-blowers and the reciprocating and adjusting mechanism, substantially as set forth.

2. A series of brush-blowers, revolved and positioned below the bolt at distances apart equal to or less than the length of the reciprocating motion, and acting, as specified, to lighten up the middlings on the bolt and keep the bolt clean, as set forth.

3. The cloth-tightening strip 7 and screw-gibs 8, applied to and combined with the bolt and its grooved frame 4, substantially as set forth.

4. The rod 12, sewed into the bolt-cloth at the head of the bolt and supported by the bar 5, in combination with the tightening-strip 7 and screw-gibs 8, substantially as set forth.

Signed by me this 19th day of January, A. D. 1874.

HERBERT S. JEWELL.

Witnesses:
GEO. T. PINCKNEY,
CHAS. H. SMITH.